(12) United States Patent
Baca et al.

(10) Patent No.: US 8,971,934 B2
(45) Date of Patent: Mar. 3, 2015

(54) MECHANISM FOR FACILITATING DYNAMIC REAL-TIME CUSTOMIZATION OF MESSAGING FOR COMPUTING SYSTEMS

(75) Inventors: Jim S. Baca, Corrales, NM (US); Lama Nachman, Santa Clara, CA (US); Burges M. Karkaria, San Jose, CA (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 13/539,192

(22) Filed: Jun. 29, 2012

(65) Prior Publication Data

US 2014/0004891 A1    Jan. 2, 2014

(51) Int. Cl.
*H04W 4/12* (2009.01)
(52) U.S. Cl.
USPC ........................................ 455/466; 379/88.19
(58) Field of Classification Search
USPC ......... 455/404.2, 415, 417, 422.1, 456.1, 466
See application file for complete search history.

(56) References Cited

U.S. PATENT DOCUMENTS

| 7,676,220 B2 | 3/2010 | Kuiken et al. |
| 8,189,759 B2 | 5/2012 | Couse et al. |
| 2007/0192418 A1 | 8/2007 | Adams et al. |
| 2009/0059897 A1 | 3/2009 | Anantharaman et al. |
| 2010/0215157 A1* | 8/2010 | Narayan et al. ............ 379/88.19 |

FOREIGN PATENT DOCUMENTS

WO    WO 2008-050325 A1    5/2008

OTHER PUBLICATIONS

PCT/US2013/044562 "Notification of Transmittal of the International Search Report and the Written Opinion of the International Searching Authority, or the Declaration" mailed Sep. 4, 2013, pp. 14.

* cited by examiner

*Primary Examiner* — Kashif Siddiqui
(74) *Attorney, Agent, or Firm* — Blakely, Sokoloff, Taylor & Zafman LLP

(57) ABSTRACT

A mechanism is described for facilitating real-time customization of messages to be transmitted between computing systems according to one embodiment of the invention. A method of embodiments of the invention includes receiving a notification relating to call made to a first computing device from a second computing device. The call may remain unanswered. The method may further include accessing a first data relating to a current status of the first computing device, analyzing the first data, and customizing, in real-time, a response based on the analyzed first data. The method may further include transmitting the customized response to the second computing device, in response to the unanswered call.

18 Claims, 5 Drawing Sheets

MECHANISM FOR FACILITATING DYNAMIC REAL-TIME CUSTOMIZATION OF MESSAGING FOR COMPUTING SYSTEMS

FIELD

Embodiments of the invention relate to messaging systems. More particularly, embodiments of the invention relate to a mechanism for facilitating dynamic real-time customization of messaging for computing systems.

BACKGROUND

With conventional messaging systems, when a call is placed from a first phone to a second phone, the caller (e.g., the user of the first phone) simply hears the second phone ring several times and the call go to voicemail if the second phone is not answered. The caller may not know why the second phone was not answered and that can often lead to the caller calling the second phone and/or other phones associated with receiving party (e.g., the user of the second phone) whom the caller is trying to reach until the caller reaches the receiving party or simply gives up in frustration.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

In one embodiment, a mechanism is provided for facilitating dynamic customization of messages communicated between computing devices (e.g., smartphones). For example and in one embodiment, when a first user (also referred to as "subscriber") of a first smartphone calls a second user (also referred to as "caller") of a second smartphone, the first user may receive a granular response with real-time device and/or user information if the second smartphone does not answer the call. It is contemplated that the call may be an audio call (voice/telephone call) or an audio/visual call, such as using Skpe® or FaceTime®. For example, the first user may be sent a message via the first smartphone that the second smartphone has run out of battery and that the first user may leave a voicemail or call back in an approximate period of time (e.g., one hour) or call another phone (e.g., office phone, home landline phone, etc.) associated with the second smartphone. In one embodiment, a cloud service may be used to store this and other real-time updated information that a phone and/or data service provider or a third-party (e.g., software company, licensed/contracted party) can access, as necessitated. In another embodiment, a storage mechanism or database at the service provider or the third-party may be used for storage and access of information.

In one embodiment, the real-time device and/or user information may be periodically supplied by the user or, in another embodiment, automatically inferred by the mechanism. For brevity, clarity, and ease of understanding, this document focuses on mobile computing devices, such as smartphones, but it is contemplated that embodiments of the present invention are not limited to such device and that they are applicable to and workable with any number and type of existing and future computing devices.

Figure 1:
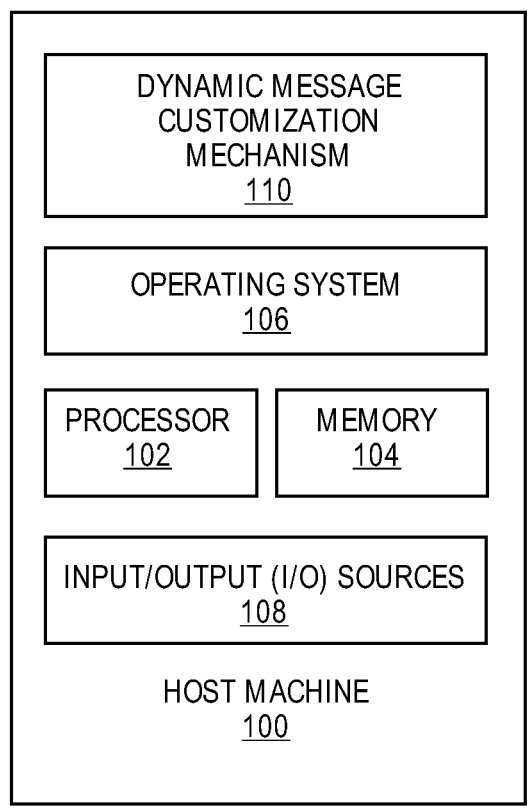
FIG. 1 illustrates a dynamic message customization mechanism employed at a host machine according to one embodiment of the invention.

FIG. 1 illustrates a dynamic message customization mechanism 110 employed at a host machine 100 according to one embodiment of the invention. Host machine (e.g., a computing device, such as computing system 400 of FIG. 4) 100 is illustrated as having dynamic message customization mechanism ("customization mechanism") 110 to facilitate dynamic and real-time customization of messages communicated between computing devices (e.g., smartphones, etc.). Computing device 100 may include mobile computing devices, such as cellular phones including smartphones (e.g., iPhone®, BlackBerry®, etc.), other phones (e.g., landlines), handheld computing devices, personal digital assistants (PDAs), etc., tablet computers (e.g., iPad®, Samsung® Galaxy Tab®, etc.), laptop computers (e.g., notebook, netbook, Ultrabook™, etc.), e-readers (e.g., Kindle®, Nook®, etc.), etc. Computing device 100 may further include set-top boxes (e.g., Internet-based cable television set-top boxes, etc.), and larger computing devices, such as desktop computers, server computers, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", and the like, are used interchangeably and synonymously throughout this document.

Figure 2:
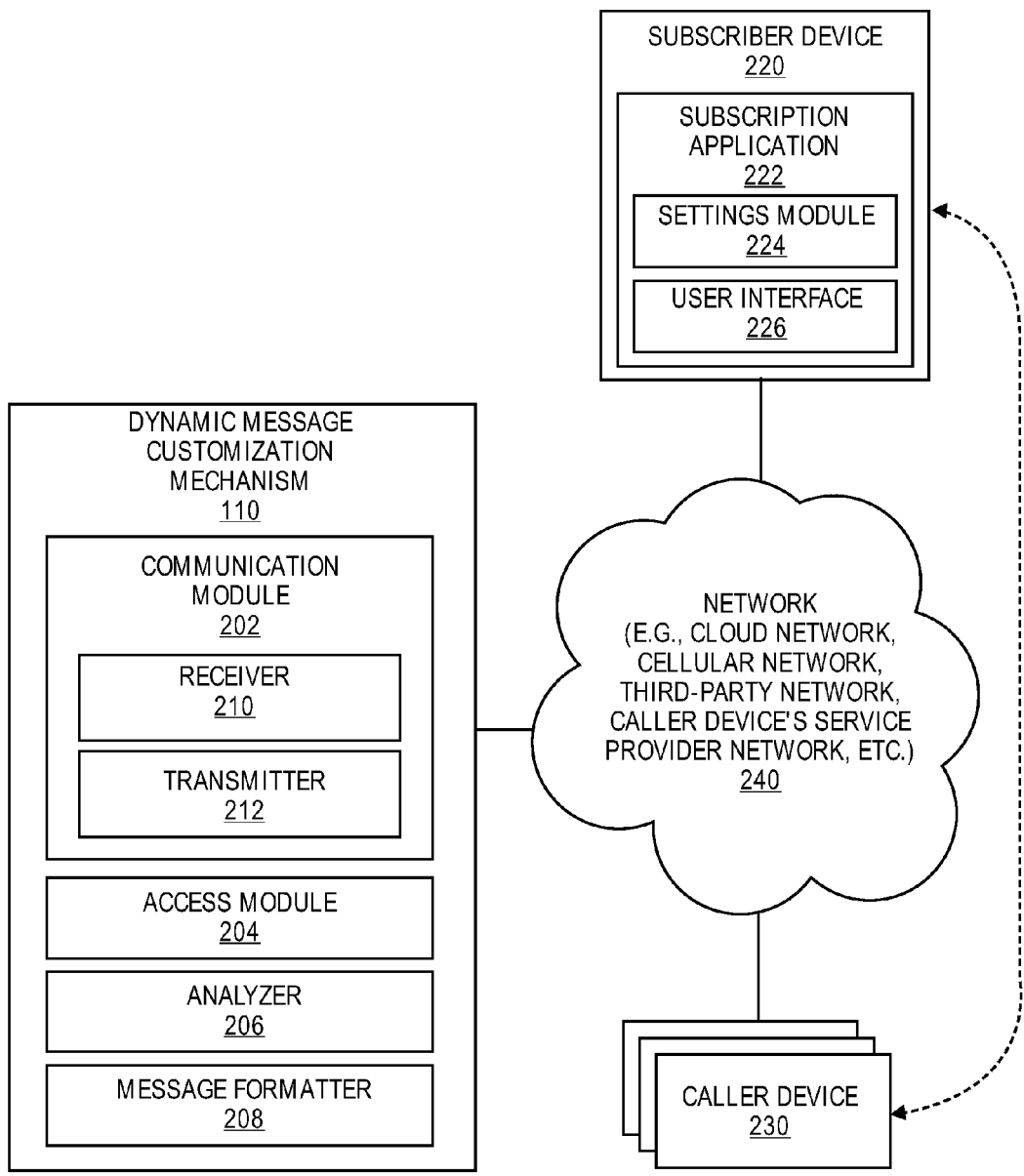
FIG. 2 illustrates a dynamic message customization mechanism according to one embodiment.

FIG. 2 illustrates a dynamic message customization mechanism 110 according to one embodiment. In one embodiment, customization mechanism 110 includes a number of components (also referred to as "modules" or "logic"), such as a communication module 202 having a receiver 210 and a transmitter 212, an access module 204, an analyzer 206, and a message formatter 208. In one embodiment, customization mechanism 110 may be employed by a service provider, such as a phone/data service provider to subscriber device (e.g., a computing device, such as a smartphone, a tablet computer, etc.). In another embodiment, customization mechanism 110 may be employed by a third-party, such as an Internet-based service provider (e.g., Skype®), a software company, an organization in contract with the subscriber device's service provider, or the like.

In one embodiment, subscriber device 220 may opt-in or choose to subscribe to the services provided by customization mechanism 110 by downloading subscription application 222. Subscription application 222 may include components (also referred to as "modules" or "logic"), such as settings module 224 and user interface 226 to allow the user of the subscriber device 220 to perform various tasks, such as supplying device status updates (e.g., battery is dead, etc.) that can then be saved at a cloud 240 to be used by customization mechanism 110 to form and send customized messages to caller device 230. Call device 230 may include any number and type of devices, including computing devices, such as smartphones, tablet computers, etc., and other device, such as landline telephones, etc. Network 240 may include one network or a combination of networks, such as a cloud network have a number of computing and storage device to hold device/user updates and other historical information as supplied by the user of subscription device 220 (to be accessed by customization mechanism 110) and/or analysis as inferred and responses as customized by customization mechanism 110. Network 240 may further include a cellular network between subscriber device 220 and its service provider, a third-party network to facilitate a third-party having customization mechanism 110, one or more networks for communication between subscriber device 220 and caller device 230 as there may be one or more other networks (e.g., a service provider network for caller device 230 and its service provider) overlapping network 240 or separate from it.

In one embodiment, (the user/owner of) subscriber device 220 opts-in and subscribes to services provided by customization mechanism 110 by downloading subscription application 222. The subscription allows the user to use the subscription application 222 to store specific real-time device and/or user information in, for example, the service provider's cloud 240 to allow for finer granularity responses disclosing current/real-time status of subscriber device 220 and/or its user to be sent back to (the user/owner of) caller device 230. In one embodiment, subscription application 222 provides user interface 226, powered by settings module 224, to allow the user of subscriber device 220 to use user interface 226 to supply certain information relating to status of subscriber device 220 and/or its user. This status information is then stored in the cloud 240 associated with the service provider and/or a third-party provider.

Some examples of real-time status information relating to status of subscriber device 220 and/or its user include, but is not limited to, battery status of subscriber device 220, coverage area of subscriber device 220 (e.g., in or out of coverage area, anticipated return to coverage area based on travel speed, calendar entries, etc.), Global Positioning System (GPS) location of subscriber device 220, airplane mode status, travel destination prediction and anticipated time of arrival/departure based on user supplied status and/or user supplied calendar entries, status based on device/user history and/or automatic calendar entries (e.g., subscriber device 220 is turned off from 11 pm to 7 am, user in meeting every third Wednesday of the month from 2 pm to 3 pm, etc.), and the like.

Let us suppose the user of subscriber device 220 provides battery status (e.g., ""battery is about to die", "battery is low", "battery is at 8%", "power is low", etc.) of subscriber device 220 using settings module 224, via user interface 226, which is then stored, for example, in the cloud 240. Now, for example, a caller, using caller device 230, calls subscriber device 220 but the call is not answered. At this point, conventionally, the caller would be directed to voicemail without any explanation or reason. However, in one embodiment, receiver 210 at communication module 202 receives the call or information (e.g., a call notification) from subscriber device 220 that the call has been received. This call notification may then be forwarded on to access module 204 to access relevant information about subscriber device 220 or its user from a computing device and/or storage medium in the cloud network 240. In this example, access module 204 accesses the cloud 240 and finds the status update: "battery is dead" and forwards it on to analyzer 206.

In one embodiment, analyzer 206 reviews any relevant information (such as service contract details, historical data (e.g., device/user history, such as family time every evening 7 pm-8 pm), etc.) available in the cloud 240 or supplied by the subscriber (such as calendar entries (e.g., flight schedules), etc.) to determine whether any additional suggestions or instructions (e.g., when to call back) can be provided to the caller via caller device 230. In this example, let us say that the subscriber is in the office and by reviewing the relevant historical data (e.g., typically the phone is ready in approximately 30 minutes when the subscriber is in the office, etc.) and/or any supplemental information (e.g., "need 30 mins to charge") as provided by the subscriber, analyzer 206 determines that the phone is expected to be charged back in about 30 minutes. In one embodiment, access module 204 may access both the historical data and the supplemental data at the cloud 240 and provide it to analyzer 206 for review.

In one embodiment, analyzer provides the relevant historical data and/or user-supplied supplemental information to message formatter 208 to format or customize an appropriate message, accordingly. For example, message formatter 208 prepares a customized message (e.g., "Sony to have missed your call. Phone has run out of battery. Please call back in 30 minutes. Thank you.") based on the historical data and/or supplemental information and forwards it on to transmitter 212 at communication module 202. Transmitter 212 transmits the customized message to caller device 230 via network 240 and/or subscriber device 220 in response to the call placed by subscriber device 220.

It is contemplated that embodiments of the invention are not limited to the aforementioned example, such as subscriber device 220 may not be accessible for any number of reasons (e.g., airplane mode, out of coverage area, lost signal, turned off because subscriber on vacation or in meeting, or the like) and that by simply registering enough supplemental information or by accessing relevant information (e.g., historical data, service contract details, etc.), customization mechanism, via analyzer 206, can infer where and/or when the phone will be reachable again and be able to provide that information to any number and type of caller devices 230. For example, if subscriber device 220 loses connectivity, its service may infer how and why the connectivity was lost (e.g., by the known physical location of service device 220 where the connectivity was lost, etc.) and how and when the connectivity is expected to be gained back (e.g., by the current location, known or expected destination, travel speed of subscriber device 220, etc.). In this case, for example, subscriber device 220 itself may itself detect its location (such as via GPS or navigation technology) and supply that information to customization mechanism 110 and/or store it in the cloud 240 for access module 204 to access as necessitated. In another example, the subscriber may place subscription device 220 in airplane mode prior to taking off and simply register, via subscription application 222, its current location and/or next destination and using the registered information, customization mechanism, via analyzer 206, may infer the flight details of the user and include it in customized messages to caller devices 230. In one embodiment, for the sake of privacy, users (e.g., subscriber) may set their privacy controls (e.g., complete, moderate, low), using subscription application 222, regarding how much and/or what type of information they would like to share with other users (e.g., callers, other subscribers, etc.). It is contemplated that individuals may be set at or assigned a privacy level based on their corresponding phone numbers, such using caller identification (ID).

It is contemplated that any number and type of components may be added to and/or removed from customization mechanism 110 to facilitate various embodiments of the invention including adding, removing, and/or enhancing certain features. For example, messages may be prioritized along with being customized, such as certain callers (e.g., family members) may have priority over others in get through to subscribers, preserving resources of subscription device 220 under certain conditions, such certain phone calls or downloading of applications may not be allowed in case of low battery charge or subscription device 220 getting in and out of connectivity or service zones, or the like. For brevity, clarity, and ease of understanding of the customization mechanism 110, many of the standard and/or known components, such as those of a computing device, are not shown or discussed here. It is contemplated that embodiments of the invention are not limited to any particular technology, topology, system, architecture, and/or standard and are dynamic enough to adopt and adapt to any future changes.

Figure 3A:
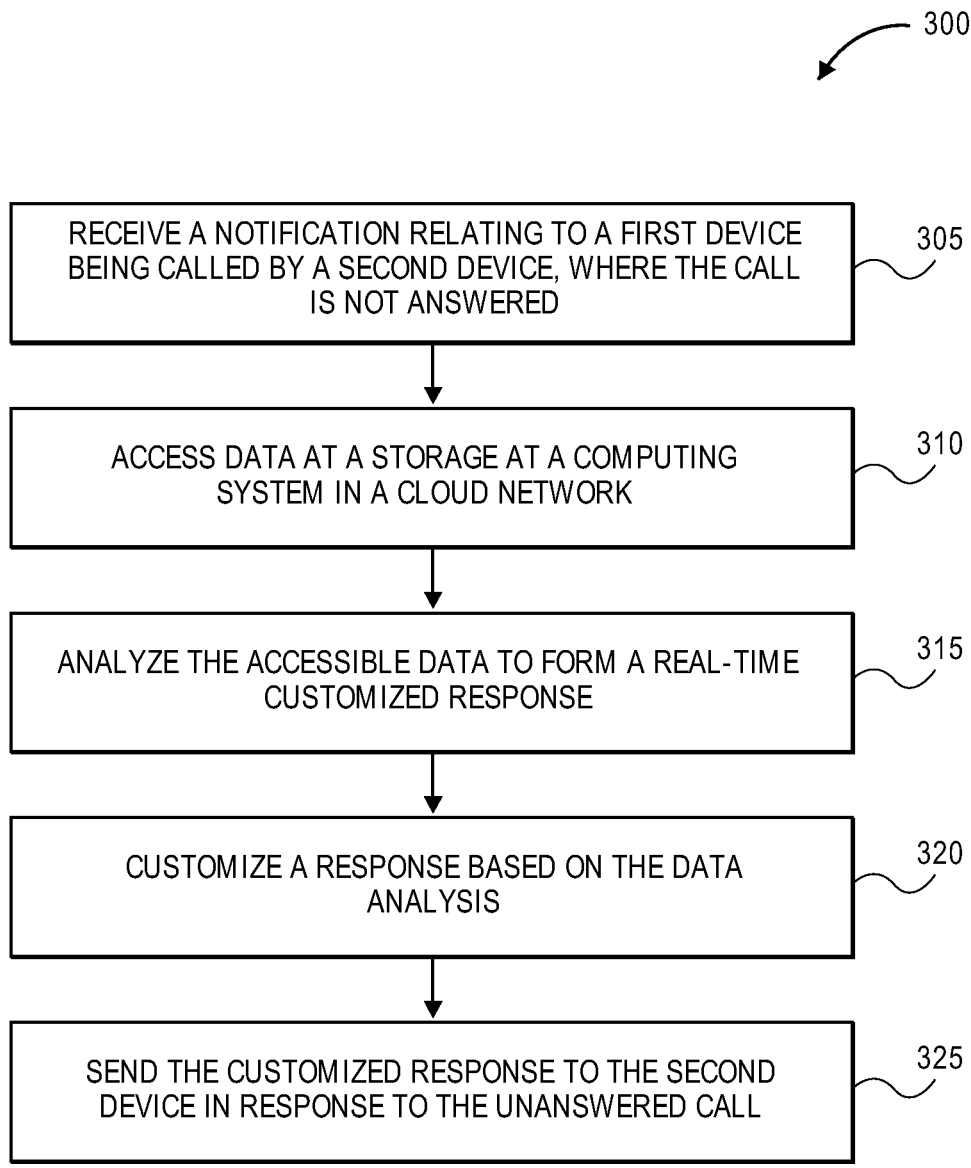
FIGS. 3A and 3B illustrates a method for facilitating generation of dynamic real-time customized messages to be transmitted between computing devices according to one embodiment of the invention.
Figure 3B:
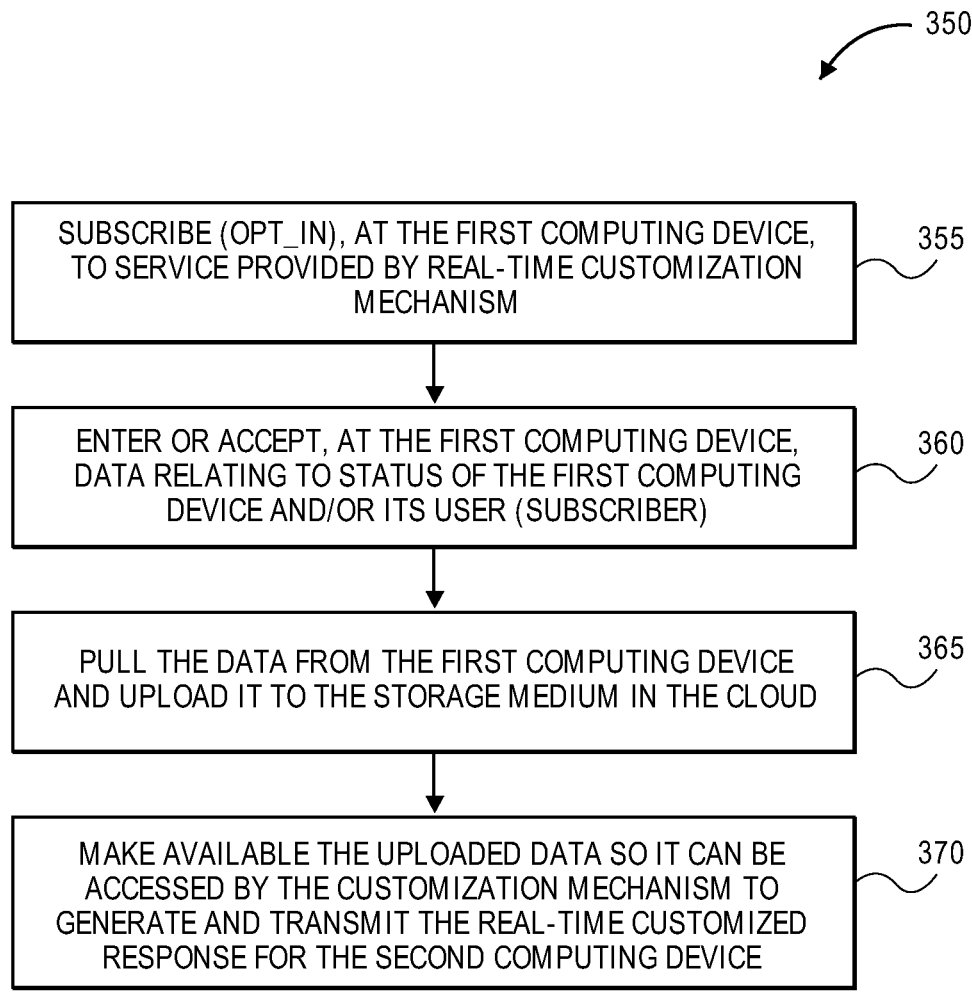

FIGS. 3A and 3B illustrates a method for facilitating generation of dynamic real-time customized messages to be transmitted between computing devices according to one embodiment of the invention. Methods 300 and 350 may be performed by processing logic that may comprise hardware (e.g., circuitry, dedicated logic, programmable logic, etc.), software (such as instructions run on a processing device), or a combination thereof. In one embodiment, method 300 may be performed by customization mechanism 110 of FIG. 1, while method 350 may be performed by subscription application 222 of FIG. 2.

Method 300 begins at block 305 with customization mechanism at a host computing system at a primary service provider or a third-party, etc., a notification regarding a call is received. The call may include a phone call placed at a first computing device (e.g., a subscriber smartphone) by a second computing device (e.g., a caller smartphone). The call is missed or not answered by the first computing device. At block 310, in response to the notification, the customization mechanism accesses data (e.g., user-inputted status information, historical data, service contract details, GPS/navigation information, etc.) at a storage system at a computing system in, for example and in one embodiment, in the cloud. At block 315, the data is analyzed for customizing an appropriate granular response (e.g., having information relating to the missed call, such as why the call was not answered and/or when to call back, etc.). It is contemplated that various forms of responses may be used, such as textual responses (such as text messages, emails, etc.), audio responses (such as in the callee's voice or someone else's voice, etc.), video or visual (such as video clips, photographs, etc.) responses, etc. At block 320, a response is customized in real-time by the customization mechanism. At block 325, the customized response is transmitted to the second computing device.

Now referring to FIG. 3B, method 350 begins at block 355 with the first computing device subscribing to services of the customization mechanism for generating and transmitting real-time customized messages by installing (e.g., downloading online, etc.) a subscription application on the first device. At block 360, the user (e.g., subscriber) of the first computing device enters any data or information relating to status of the first computing device and/or the user (e.g., subscriber) using the subscription application. At block 365, this data/information is pulled from the first computing device and uploaded to the storage system in the cloud. At block 370, once the data is uploaded, it is provided or made available to the customization mechanism to accessed, as necessitated and appropriate, to generate and transmit real-time customized messages.

Figure 4:
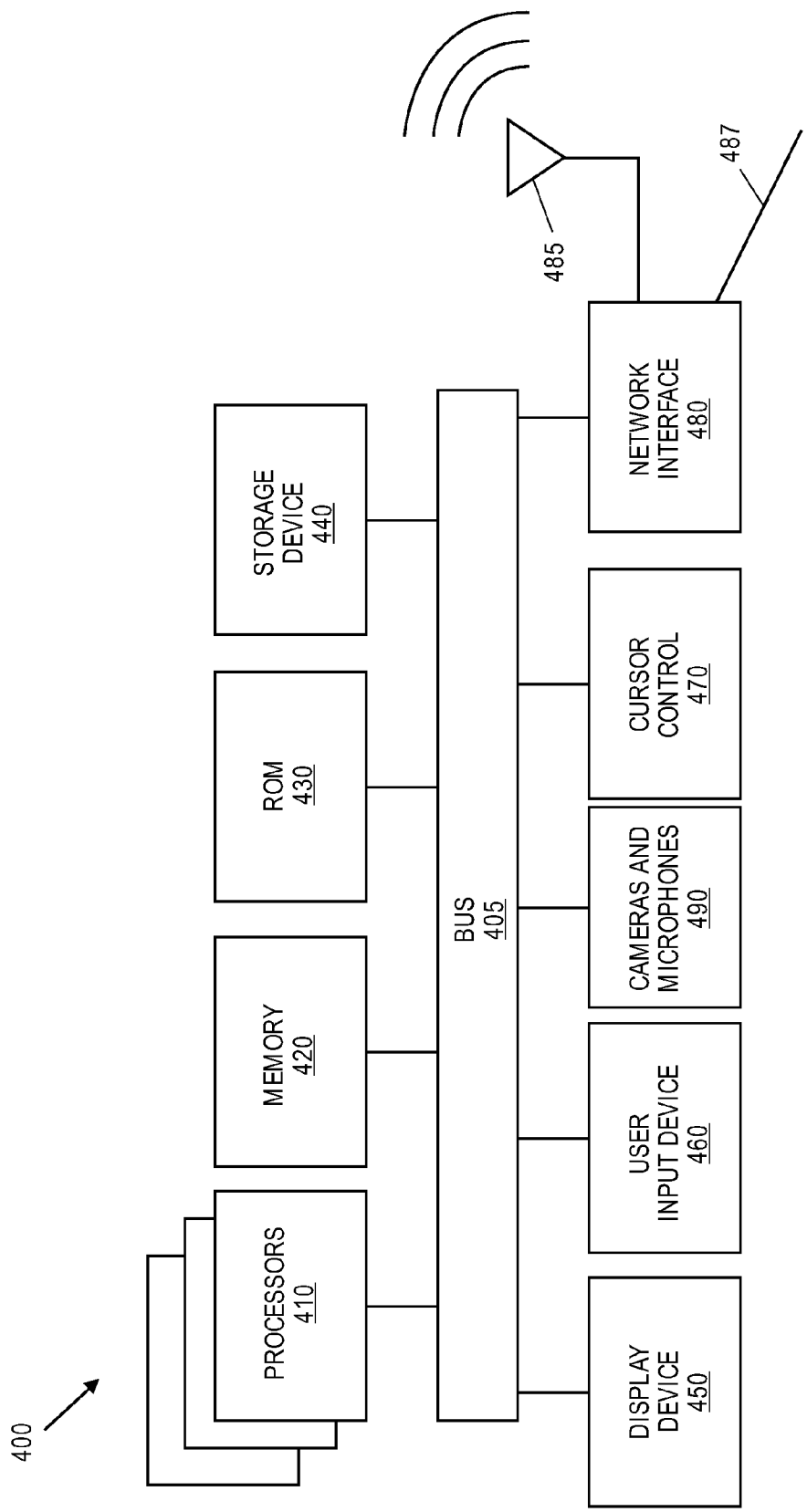
FIG. 4 illustrates computer system suitable for implementing embodiments of the present disclosure according to one embodiment of the invention.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450.

Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), wide area network (WAN), metropolitan area network (MAN), personal area network (PAN), Bluetooth, an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising receiving a notification relating to call made to a first computing device from a second computing device, wherein the call remains unanswered; accessing a first data relating to a current status of the first computing device; analyzing the first data; customizing, in real-time, a response based on the analyzed first data; and transmitting the customized response to the second computing device, in response to the unanswered call.

Embodiments or examples include any of the above methods wherein accessing further comprises accessing a second data including historical data relating to historical functioning of the first computing device and historical activities of a user of the first computing device.

Embodiments or examples include any of the above methods wherein accessing further comprises accessing a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

Embodiments or examples include any of the above methods wherein analyzing further comprises analyzing one or more of the first data, the second data, and the third data.

Embodiments or examples include any of the above methods wherein the response is further customized based on one or more of the analyzed first data, the analyzed second data, and the analyzed third data.

Embodiments or examples include any of the above methods wherein the first, second and third data are stored at a cloud storage device coupled to a computing system of a cloud network.

Embodiments or examples include any of the above methods wherein the first, second and third data are accessed, over a network, at the cloud storage device by the service provider of the first computing device or a third-party vendor.

In another embodiment or example, a method comprises: subscribing, at a first computing system, a service to generate, in real-time, customized messages to be transmitted to a plurality of second computing systems, wherein the customized messages include data relating to status of the first computing system or a user of the first computing system; and providing the data to a storage medium in a cloud network, wherein the data is accessed by the service to generate the customized messages to be transmitted to a second computing device.

Embodiments or examples include any of the above methods wherein transmitting is performed in response to the second computing device being unsuccessful in reaching the first computing device.

Embodiments or examples include any of the above methods wherein subscribing comprises downloading a software application to provide link between the first computing device and the service.

In another embodiment or example, an apparatus comprises: a message customization mechanism having first logic to receive a notification relating to call made to a first computing device from a second computing device, wherein the call remains unanswered; second logic to access a first data relating to a current status of the first computing device; third logic to analyze the first data; forth logic to customize, in real-time, a response based on the analyzed first data; and fifth logic to transmit the customized response to the second computing device, in response to the answered call.

Embodiments or examples include the apparatus above further comprising means for accessing a second data including historical data relating to historical functioning of the first computing device and historical activities of a user of the first computing device.

Embodiments or examples include the apparatus above further comprising means for accessing a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

Embodiments or examples include the apparatus above further comprising means for analyzing one or more of the first data, the second data, and the third data.

Embodiments or examples include the apparatus above wherein the response is further customized based on one or more of the analyzed first data, the analyzed second data, and the analyzed third data.

Embodiments or examples include the apparatus above wherein the first, second and third data are stored at a cloud storage device coupled to a computing system of a cloud network.

Embodiments or examples include the apparatus above wherein the first, second and third data are accessed, over a network, at the cloud storage device by the service provider of the first computing device or a third-party vendor.

In another embodiment or example, a system comprises: a computing device having a memory to store instructions, and a processing device to execute the instructions, wherein the instructions cause the processing device to receive a notification relating to call made to a first computing device from a second computing device, wherein the call remains unanswered; access a first data relating to a current status of the first computing device; analyze the first data; customize, in real-time, a response based on the analyzed first data; and transmit the customized response to the second computing device, in response to the unanswered call.

Embodiments or examples include the system above wherein the processing device is further to access a second data including historical data relating to historical functioning of the first computing device and historical activities of a user of the first computing device.

Embodiments or examples include the system above wherein the processing device is further to access a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

Embodiments or examples include the system above wherein the processing device is further to analyze one or more of the first data, the second data, and the third data.

Embodiments or examples include the system above wherein the response is further customized based on one or more of the analyzed first data, the analyzed second data, and the analyzed third data.

Embodiments or examples include the system above wherein the first, second and third data are stored at a cloud storage device coupled to a computing system of a cloud network.

Embodiments or examples include the system above wherein the first, second and third data are accessed, over a network, at the cloud storage device by the service provider of the first computing device or a third-party vendor.

In another embodiment or example, a system comprises: a computing device having a memory to store instructions, and a processing device to execute the instructions, wherein the instructions cause the processing device to subscribe, at a first computing system, a service to generate, in real-time, customized messages to be transmitted to a plurality of second computing systems, wherein the customized messages include data relating to status of the first computing system or a user of the first computing system; and provide the data to a storage medium in a cloud network, wherein the data is accessed by the service to generate the customized messages to be transmitted to a second computing device.

Embodiments or examples include the system above wherein transmitting is performed in response to the second computing device being unsuccessful in reaching the first computing device.

Embodiments or examples include the system above wherein subscribing comprises downloading a software application to provide link between the first computing device and the service.

In another embodiment or example, an apparatus comprises means for performing any one or more of the operations mentioned above.

In yet another embodiment or example, at least one machine-readable medium comprising a plurality of instructions that in response to being executed on a computing device, causes the computing device to carry out a method according to any one or more of the operations mentioned above.

In yet another embodiment or example, at least one non-transitory or tangible machine-readable comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one machine-readable storage medium comprising a plurality of instructions that in response to being executed on a computing device, causes the computing device to carry out a method according to one or more operations comprising:
    placing a call at a first computing device by a second computing device over a network, wherein the first computing device subscribes to a message customization service, wherein the call is missed at the first computing device;
    receiving, in real-time, a notification relating to the missed call, wherein the notification includes a customized notification based on a current status of the first computing device; and
    accessing, in real-time, a first data relating to the current status of the first computing device, wherein the first data is modified corresponding to changes in the current status.

2. The machine-readable medium of claim 1, wherein accessing further comprises accessing a second data including historical data relating to historical functioning of the first computing device and historical activities of a user of the first computing device.

3. The machine-readable medium of claim 1, wherein accessing further comprises accessing a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

4. A method comprising:
    placing a call at a first computing device by a second computing device over a network, wherein the first computing device subscribes to a message customization service, wherein the call is missed at the first computing device;
    receiving, in real-time, a notification relating to the missed call, wherein the notification includes a customized notification based on a current status of the first computing device; and
    accessing, in real-time, a first data relating to the current status of the first computing device, wherein the first data is modified corresponding to changes in the current status.

5. The method of claim 4, wherein accessing further comprises accessing a second data including historical data relating to historical functioning of the first computing device and historical activities of a user of the first computing device.

6. The method of claim 4, wherein accessing further comprises accessing a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

7. An apparatus comprising:
    a message customization mechanism having
    first logic to place a call at a first computing device by a second computing device over a network, wherein the first computing device subscribes to a message customization service, wherein the call is missed at the first computing device;
    second logic to receive, in real-time, a notification relating to the missed call, wherein the notification includes a customized notification based on a current status of the first computing device; and
    third logic to access, in real-time, a first data relating to the current status of the first computing device, wherein the first data is modified corresponding to changes in the current status.

8. The apparatus of claim 7, wherein the third logic is further to access a second data including historical data relating to historical functioning of the first computing device and historical activities of a user of the first computing device.

9. The apparatus of claim 7, wherein the third logic is further to access a third data including miscellaneous data relating to the first computing device or the user, wherein the miscellaneous data includes one or more of details of a service contract between a service provider and the first computing device, details of service areas of the first computing device, readings of a Global Positioning System (GPS) relating to the first computing device, and appointment calendar entries relating to activities of the user.

10. The machine-readable medium of claim 1, wherein the first computing device opts-in or opts-out of subscribing to the message customization service, wherein the message customization service is provided by a service provider or a third-party vendor over the network, the network including a cloud network or the Internet.

11. The machine-readable medium of claim 10, wherein real-time data relating to status activities the first computing device is provided to the message customization service, wherein the current status is based on the status activities.

12. The machine-readable medium of claim 1, wherein the current status includes one or more of battery power, coverage area, anticipated return to the coverage area, travel speed, calendar entries, GPS location, airplane mode, predictions relating to a travel destination, arrival or departure time, user pattern or history relating to the user or a caller associated with the second computing device, device pattern or history relating to the first computing device or the second computing device, and privacy controls including one or more of low privacy control, medium privacy control, and high privacy control.

13. The method of claim 4, wherein the first computing device opts-in or opts-out of subscribing to the message customization service, wherein the message customization service is provided by a service provider or a third-party vendor over the network, the network including a cloud network or the Internet.

14. The method of claim 13, wherein real-time data relating to status activities the first computing device is provided to the message customization service, wherein the current status is based on the status activities.

15. The method of claim 4, wherein the current status includes one or more of battery power, coverage area, anticipated return to the coverage area, travel speed, calendar entries, GPS location, airplane mode, predictions relating to a travel destination, arrival or departure time, user pattern or history relating to the user or a caller associated with the second computing device, device pattern or history relating to the first computing device or the second computing device, and privacy controls including one or more of low privacy control, medium privacy control, and high privacy control.

16. The apparatus of claim 7, wherein the first computing device opts-in or opts-out of subscribing to the message customization service, wherein the message customization service is provided by a service provider or a third-party vendor over the network, the network including a cloud network or the Internet.

17. The apparatus of claim 16, wherein real-time data relating to status activities the first computing device is provided to the message customization service, wherein the current status is based on the status activities.

18. The apparatus of claim 7, wherein the current status includes one or more of battery power, coverage area, anticipated return to the coverage area, travel speed, calendar entries, GPS location, airplane mode, predictions relating to a travel destination, arrival or departure time, user pattern or history relating to the user or a caller associated with the second computing device, device pattern or history relating to the first computing device or the second computing device, and privacy controls including one or more of low privacy control, medium privacy control, and high privacy control.

\* \* \* \* \*